United States Patent
Mansfield

(10) Patent No.: US 11,479,346 B2
(45) Date of Patent: Oct. 25, 2022

(54) AIRCRAFT LANDING GEAR NOISE REDUCTION FAIRING

(71) Applicant: Safran Landing Systems UK Limited, Gloucester (GB)

(72) Inventor: Ricky Peter Mansfield, Gloucester (GB)

(73) Assignee: Safran Landing Systems UK LTD

( * ) Notice: Subject to any disclaimer, the term of this patent is extended or adjusted under 35 U.S.C. 154(b) by 359 days.

(21) Appl. No.: 16/392,726

(22) Filed: Apr. 24, 2019

(65) Prior Publication Data
US 2019/0329875 A1    Oct. 31, 2019

(30) Foreign Application Priority Data

Apr. 25, 2018  (EP) ..................................... 18169353

(51) Int. Cl.
| | |
|---|---|
| *B64C 25/00* | (2006.01) |
| *B60B 27/00* | (2006.01) |
| *B64C 25/10* | (2006.01) |
| *F16D 65/00* | (2006.01) |

(52) U.S. Cl.
CPC ........ *B64C 25/001* (2013.01); *B60B 27/0047* (2013.01); *B64C 25/10* (2013.01); *F16D 65/0006* (2013.01); *B60B 2900/133* (2013.01); *B64C 2025/003* (2013.01)

(58) Field of Classification Search
CPC ....... B64C 2025/003; B64C 7/00; B64C 7/02; B64C 25/00; B64C 25/001; B64C 25/16
USPC ......................................................... 244/1 N
See application file for complete search history.

(56) References Cited

U.S. PATENT DOCUMENTS

| | | | | |
|---|---|---|---|---|
| 2,719,016 | A * | 9/1955 | Wicks ..................... | B64C 25/66 244/102 R |
| 7,669,798 | B2 * | 3/2010 | Guering .................. | B64C 25/32 244/121 |
| 8,490,914 | B2 * | 7/2013 | Chow ................... | B64C 25/001 244/1 N |
| 9,027,878 | B2 * | 5/2015 | Simonneaux ......... | B64C 25/001 244/100 R |
| 9,650,154 | B2 * | 5/2017 | Cook ..................... | B64D 47/04 |
| 10,286,995 | B2 * | 5/2019 | Lacy ..................... | B64C 25/001 |
| 2003/0102406 | A1 * | 6/2003 | Chow ..................... | B64C 25/16 244/100 R |
| 2006/0102775 | A1 * | 5/2006 | Chow ..................... | B64C 25/16 244/1 N |

(Continued)

FOREIGN PATENT DOCUMENTS

| | | |
|---|---|---|
| EP | 1900545 A1 | 3/2008 |
| GB | 2494219 A | 3/2013 |

(Continued)

OTHER PUBLICATIONS

Extended European Search Report for European Application No. 18 169 353.2, dated Sep. 21, 2018—9 pages.

*Primary Examiner* — Richard R. Green
*Assistant Examiner* — Michael A. Fabula
(74) *Attorney, Agent, or Firm* — RatnerPrestia

(57) ABSTRACT

An aircraft landing gear assembly including a plurality of noise-inducing elements, at least one of the noise-inducing elements comprising a brake assembly or electric drive assembly, and a noise reduction fairing arranged to shield only at least a portion of the brake assembly from incident airflow.

17 Claims, 5 Drawing Sheets

(56) References Cited

U.S. PATENT DOCUMENTS

| | | | | |
|---|---|---|---|---|
| 2007/0108344 A1* | 5/2007 | Wood | ............... | B64C 25/001 |
| | | | | 244/102 R |
| 2008/0078866 A1* | 4/2008 | Parker | ............... | B60B 7/04 |
| | | | | 244/100 R |
| 2008/0142634 A1* | 6/2008 | Moe | ............... | B64C 25/34 |
| | | | | 244/1 N |
| 2009/0078821 A1* | 3/2009 | Chow | ............... | B64C 25/16 |
| | | | | 244/1 N |
| 2009/0321559 A1* | 12/2009 | Chow | ............... | B64C 25/001 |
| | | | | 244/1 N |
| 2010/0108805 A1* | 5/2010 | Piet | ............... | B64C 25/16 |
| | | | | 244/1 N |
| 2012/0043418 A1* | 2/2012 | Isotani | ............... | B64C 25/001 |
| | | | | 244/102 R |
| 2016/0185452 A1* | 6/2016 | Cox | ............... | B64F 1/002 |
| | | | | 244/50 |
| 2021/0039773 A1* | 2/2021 | Hirai | ............... | B64C 25/34 |

FOREIGN PATENT DOCUMENTS

| | | | |
|---|---|---|---|
| WO | 2004039671 | A1 | 5/2004 |
| WO | 2005102839 | A2 | 11/2005 |
| WO | 2011070340 | A1 | 6/2011 |
| WO | 2015006490 | A1 | 1/2015 |

* cited by examiner

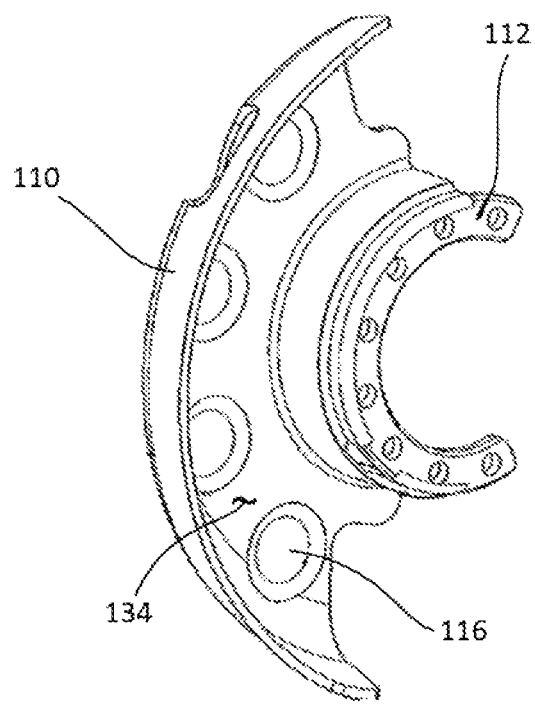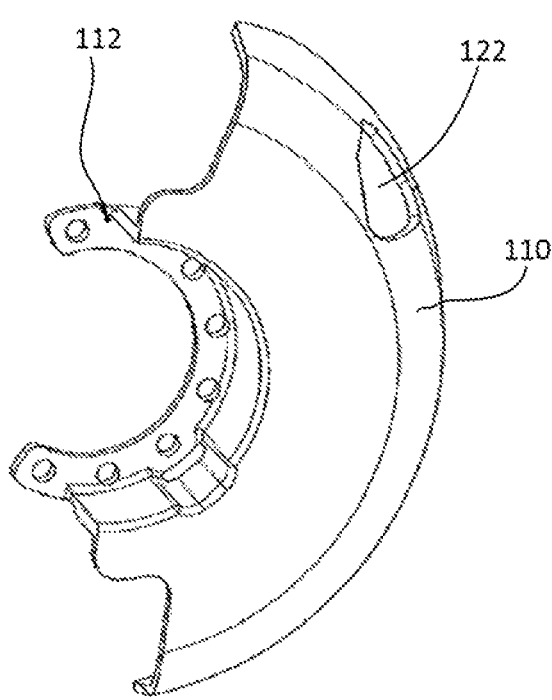
Fig. 4A  Fig. 4B
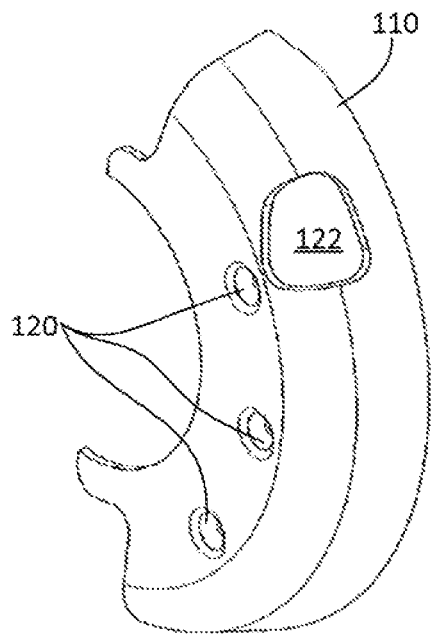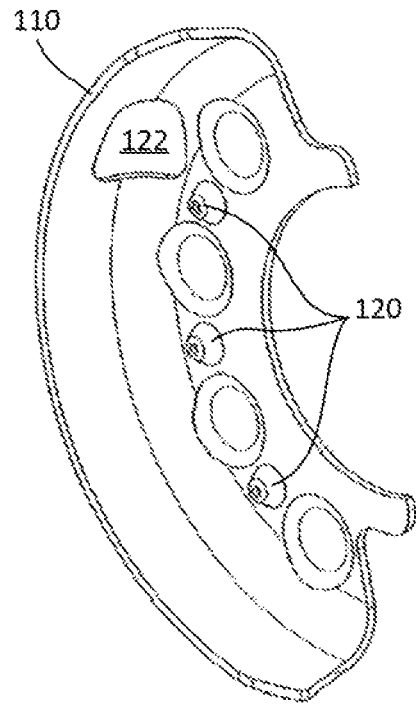
Fig. 5a  Fig. 5B

AIRCRAFT LANDING GEAR NOISE REDUCTION FAIRING

BACKGROUND OF THE INVENTION it is known that the aircraft landing gear are a significant source of noise during take-off and in particular during the landing phases (the approach, intermediate and final phases). This noise is generated by the turbulent airflow passing over and through the constituent elements of the landing gear when the landing gear is down. The turbulence is generated largely as a result of not all of the landing gear elements having an aerodynamic outer shape, or envelope. A significant portion of the landing gear generated noise is accounted for by the brakes, as a result of their complex geometry.

Existing solutions to this problem include providing one single large-size fairing on the landing gear that covers the entire area between the wheels, brakes and torque links, the fairing being designed to deflect the airflow both around the brakes and other adjacent components of the landing gear. However, a result of deflecting the airflow is that the airflow is accelerated over the fairing. When this accelerated airflow strikes other solid surfaces of the landing gear located downstream of the fairing this in turn generates further noise. This acceleration of the airflow and therefore potential increase in noise arising from further elements of aircraft landing gear therefore potentially achieves the opposite of the desired effect of the fairing.

To mitigate against the generation of additional noise as a result of accelerating airflow over a fairing it has previously been proposed to include perforations in the fairing, or provide mesh membranes as part of the fairing surface. The intended function of these mesh areas or perforations is to allow some airflow to pass through the fairing but at a reduced velocity. However, in practice the perforations and mesh areas become blocked, for example with dust or other small debris, and therefore do not allow the airflow to pass through as intended.

SUMMARY OF THE INVENTION

According to a first aspect of the present invention there is provided an aircraft landing gear assembly including a plurality of noise-inducing elements, at least one of the noise-inducing elements comprising a brake assembly or electric drive system, and a noise reduction fairing arranged to shield only at least a portion of the brake assembly or electric drive system from incident airflow.

Consequently, a noise reduction fairing according to the first aspect of the invention provides localised shielding of the brake assembly or electric drive system so as to reduce the noise caused by incident airflow over the brake assembly or electric drive system, whilst occupying a minimal amount of space.

The noise reduction fairing is preferably configured to shield a portion of the brake assembly or electric drive system from direct incident airflow whilst leaving a further portion of the brake assembly or electric drive system exposed.

By configuring the fairing to shield only the portion of the brake assembly or electric drive system subject to direct air flow, for example approximately 180 degrees of the brake assembly, the remaining portion still exposed allows sufficient cooling within an acceptable time period.

An inner surface of the noise reduction fairing may at least partially conform to an adjacent portion of the brake assembly or electric drive system.

By contouring the inner surface of the fairing to at least partially conform to the adjacent portion of the brake assembly or electric drive system, such as the brake piston housings, the space required for the fairing is reduced.

The noise reduction fairing may include a plurality of attachment points for attaching the fairing to the aircraft landing gear.

By providing multiple attachment points it is ensured that there is no single point of failure. Further preferred embodiments at least 3 attachment points are provided such that the fairing will remain secure and in position in the event of a single failure of an attachment point.

In some embodiments the fairing may be configured to be attached to a brake flange of the aircraft landing gear.

By configuring the fairing to be attached to the brake flange minimal or no modification of the remainder of the landing gear assembly is required, thus avoiding any additional costs during manufacture and design and also permitting retrofit of the noise reduction fairing to existing landing gear assemblies.

In other embodiments, the noise reduction fairing may be configured to be attached to the aircraft brake assembly itself.

Whilst attachment of the noise reduction fairing to the brake assembly itself requires additional attachment features to be incorporated within the brake assembly, an advantage of this arrangement is that the noise reduction fairing could be installed prior to fitting the brake assembly to the landing gear, thereby improving the integration and overall ease of assembly.

The noise reduction airing preferably comprises a composite material.

The advantages of the composite material include providing a lightweight solution. Additionally, the composite material and associated manufacturing process permits the profile of the noise reduction fairing to closely conform to the adjacent portion of the landing gear brake assembly, thereby reducing the space envelope required for the fitment of the fairing.

The noise reduction fairing preferably includes at east one metallic insert that defines the attachment points.

The metallic inserts ensures that the composite material is not damaged by the attachment bolts.

The composite material preferably includes a temperature resistant resin. Additionally or alternatively the fairing includes a ceramic coating.

The use of a high temperature resistant resin and/or a temperature resistance ceramic coating enables the fairing to withstand the high temperatures that occur during operation of the brakes.

At least a portion of the noise reduction fairing includes a temperature sensitive coating.

A temperature sensitive coating provides a visual indicator of either temperature reached at a particular location or an indication that a particular temperature threshold has been exceeded, thus facilitating maintenance inspections and actions.

According to a second aspect of the present invention there is provided an aircraft including one or more landing gear assemblies according to the first aspect.

BRIEF DESCRIPTION OF THE DRAWINGS

By example only, certain embodiments of the invention will now be described by reference to the accompanied drawings, which:

FIGS. 4A and 4B schematically illustrate isometric views an of a noise reduction fairing according to embodiments of the present invention;

FIGS. 5A and 5B schematically illustrate isometric views of a noise reduction fairing according to a further embodiment of the present invention;

DETAILED DESCRIPTION

Figure 1A:
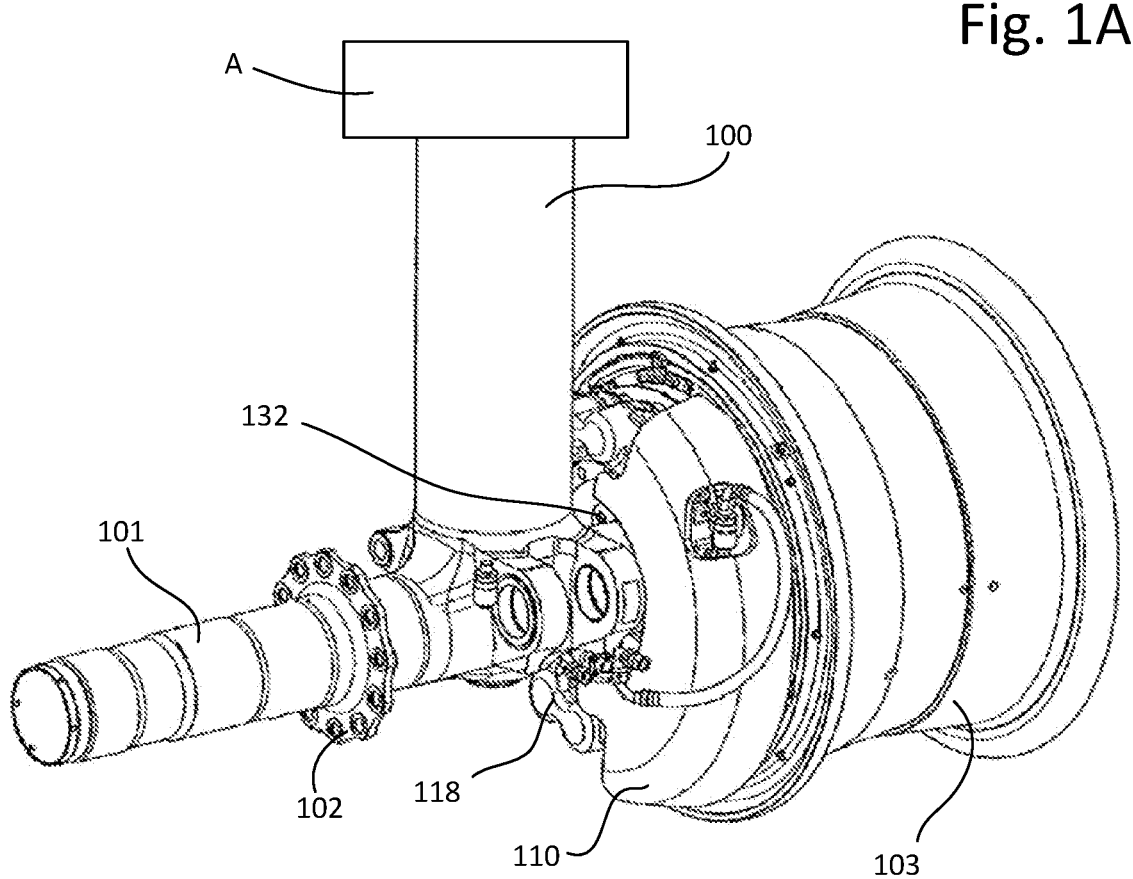
FIGS. 1A, and 2-3 schematically illustrate an aircraft landing gear assembly including a noise reduction fairing according to an embodiment of the present invention.
Figure 2:
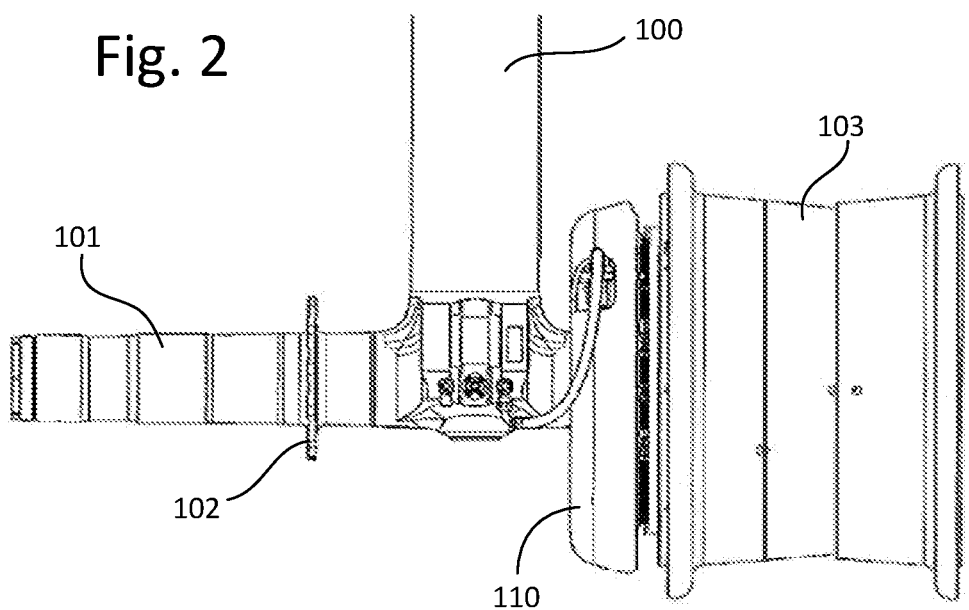
Figure 1B:
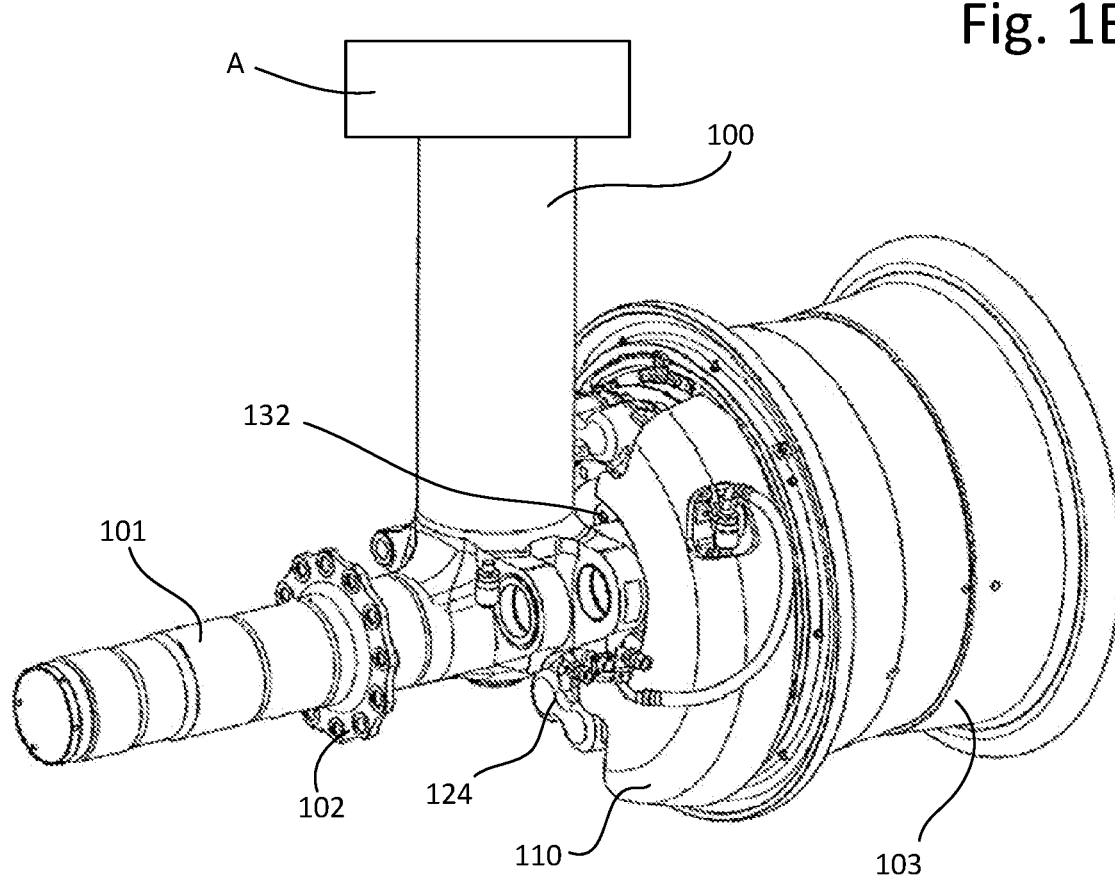
FIG. 1B schematically illustrates an aircraft landing gear assembly, including a noise reduction fairing, according to another embodiment of the present invention.
Figure 3:
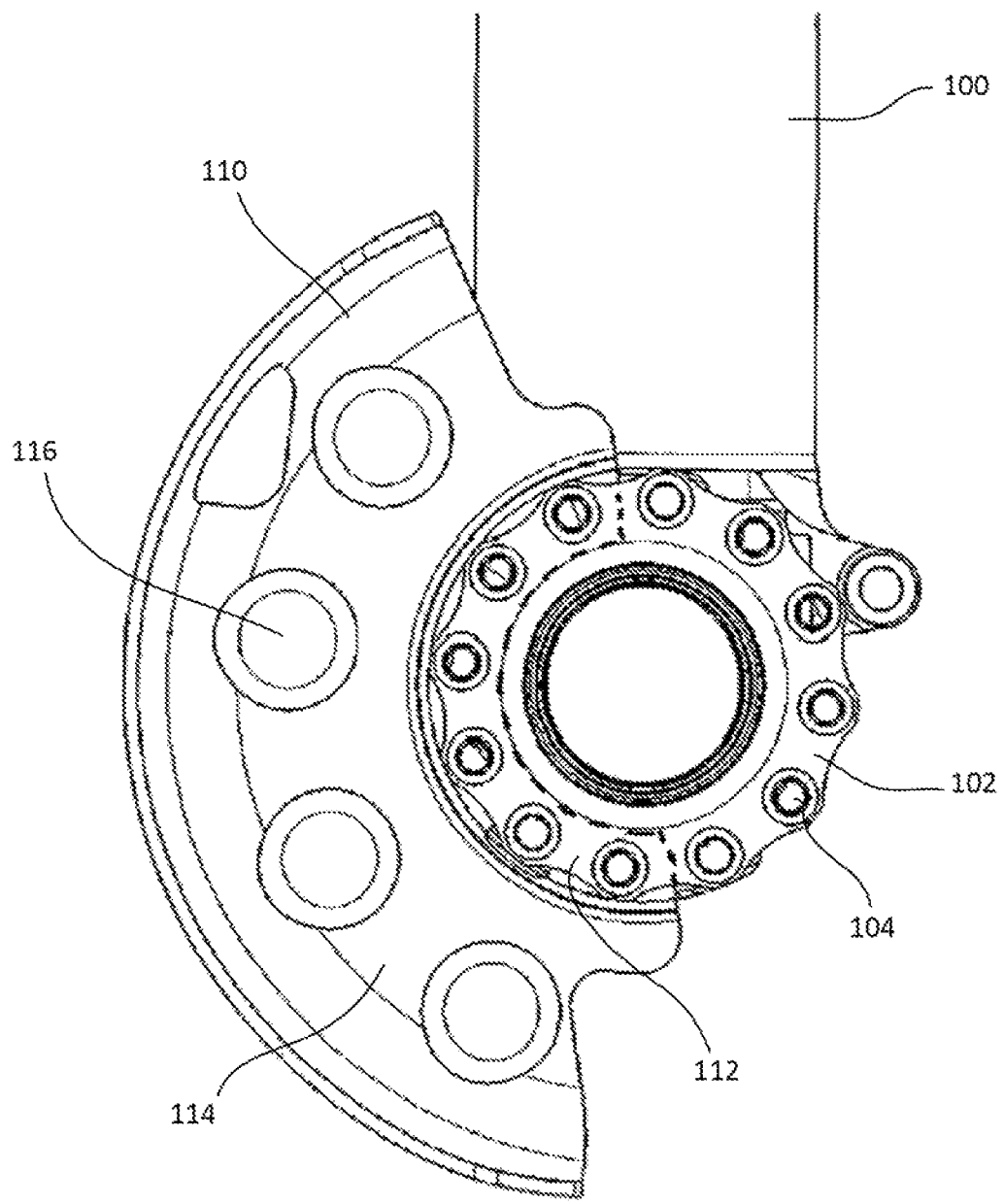

FIGS. 1A and 2-3 illustrate a portion of a landing gear assembly according to an embodiment of the present invention, in which the landing gear assembly has a brake assembly 118. FIG. 1B illustrates a portion of a landing gear assembly according to another embodiment of the present invention, in which the landing gear assembly has an electric drive system 124. The landing gear assembly includes a support strut 100 having an axle 101 rotationally mounted thereto. The axle 101 is arranged to have a pair of wheels 103 (only one wheel is illustrated in FIGS. 1A and 2 for the sake of clarity) mounted to the axle. FIGS. 1-3 illustrate a single axle landing gear but it will be appreciated that embodiments of the present invention also apply to landing gear assemblies having multiple axles mounted to a bogie beam.

The shock strut 100 includes a pair of brake flanges 102 to which respective brake assemblies 118 are arranged to be fastened to. Each brake assembly may be of any known construction but generally comprises a number of first brake discs mounted to the wheel 103 or axle 101 and a corresponding number of second brake discs mounted to the brake flange and interposed between the first set of discs, together with a number of brake pistons that are arranged, in use, to press to the sets of brake discs together. Each brake flange 102 is rigidly connected, or formed integrally with, the support strut 100 and includes a plurality of mounting holes 104 that allow the brake assembly (not illustrated in FIG. 3) to be bolted to the brake flange.

A noise reduction fairing 110 is provided and is shaped to closely fit about the inner surface of the brake assembly 118 such that the fairing is located between the brake assembly & wheel and the lower portion of the support strut 100 of the landing gear assembly. In the embodiment illustrated, the fairing generally forms a segment of a dished annulus. An attachment interface 112 is formed at the inner diameter of the annulus and in FIG. 3 is partly indicated by the broken line intercepting with the brake flange 102. The attachment interface 112, in the embodiment illustrated, is configured to be bolted, or otherwise, secured, to the brake flange using the same attachment bolts 132 used to fasten the brake assembly to the brake flange. The fairing is shaped to substantially cover at least a portion of the brake assembly that would otherwise be exposed to direct incident air flow when the landing gear is in use. In the particular embodiment illustrated in FIG. 3 a number of circular recesses 116 are formed in the inner body surface 114 of the fairing and are designed to fit around the ends of the brake cylinder housings of a brake assembly so as to ensure minimum clearances between the outer surface of the fairing 110 and other elements of the landing gear assembly are preserved. However, the recesses may not be included in fairings according to other embodiments, depending on the space available for locating the fairing.

In other embodiments the landing gear assembly may include an electric drive system 124 for directly driving at least one of the wheels. The electric drive system 124 may be provided within the same general space envelope normally occupied by a brake assembly, i.e. substantially within the wheel. Consequently, where the term 'brake assembly' is used throughout this specification it may be substituted with the term 'electric drive system'.

FIGS. 4A and 4B illustrates opposing isometric views of a noise reduction fairing 110 in accordance with some embodiments of the present invention. FIG. 4A illustrates the "inner" surface of the fairing that in use is adjacent to the brake assembly (or electric drive system). In this view the dished nature of fairing 110 is more clearly seen, as is the attachment interface 112 and the optional circular recesses 116 formed to accommodate the ends of the brake piston housings. FIG. 4B illustrates the opposite "outer" surface of the fairing 110 that will be incident to the direct airflow when the landing gear is in use and it can be seen that this surface presents minimal obstructions to any airflow. In some embodiments, one or both of the trailing edges of the fairing outer surface includes an aerodynamic spoiler (not shown) to minimise turbulence caused by the airflow separating from the trailing edge of the fairing 110.

In preferred embodiments the noise reduction fairing is configured to shield only approximately half of the overall diameter of the brake assembly or electric drive system, i.e. approximately 180 degrees. As a result, in use the fairing shields only the direct airflow that would otherwise be incident upon the brake assembly, This therefore leaves the remaining portion of the brake assembly still exposed to the remaining airflow to ensure sufficient brake cooling, such that the time taken for the brakes to cool after use is not substantially impaired and therefore does not substantially affect the time required between landing and subsequent take-off of the aircraft.

The close fitting, or localisation, of the noise reduction fairing around the brake assembly or electric drive system minimises the surface area of the fairing and therefore minimises the acceleration of airflow over the fairing, thus in turn minimising any additional noise generated by the accelerated air flow when it strikes any further components of the aircraft landing gear, In other words, the noise reduction fairing of the present invention provides localised noise reduction. This is in contrast to the relatively large fairings previously provided.

It will be appreciated that there is very little free space available in the immediate vicinity of the brake assembly in typical aircraft landing gear arrangements in which to locate a noise reduction fairing. This limits introduction of low-noise fairings and their attachments with current in-service landing gear assemblies and can potentially generate a requirement to introduce additional attachment features that can't be retrofitted or are expensive to produce. To address these issues, in some embodiments of the present invention the noise reduction fairing comprises a composite material, preferably a one-piece moulded composite part. This composite design allows the fairing to be sufficiently compact to fit within the available space envelope in the vicinity of the brake assembly whilst ensuring the desired rigidity of the fairing. The use of a composite material, and its associated manufacturing process, readily enables the fairing to be moulded to accommodate the brake piston housing geometry, thereby maximising the volume of the fairing within the desired space envelope whilst still ensuring sufficient clearances. This is particularly advantageous in allowing the noise reduction fairing to be sufficiently compact to meet the typical designed deflection requirements during use of the landing gear. The light weight of the composite material is also beneficial in minimising any potential impact on the un-sprung mass of the landing gear and overall weight of the landing gear assembly.

Figure 6:
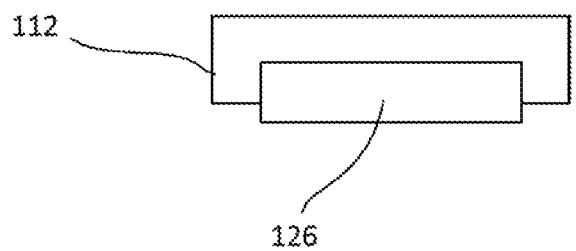
FIG. 6 schematically illustrates an attachment interface with a metallic insert.

To prevent the composite material being damaged by the fasteners used to attach the fairing, for example the bolts used to bolt the brake assembly and fairing to the brake flange, in some embodiments one or more metallic inserts 126 (FIG. 6) are embedded in the composite material within the attachment interface 112.

Figure 7:
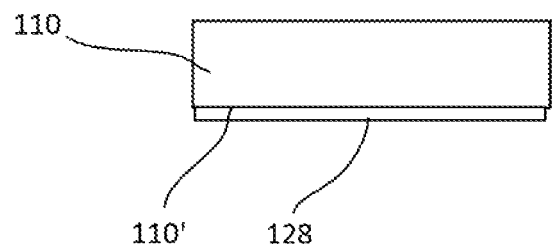
FIG. 7 schematically illustrates an attachment interface with a ceramic coating.
Figure 8:
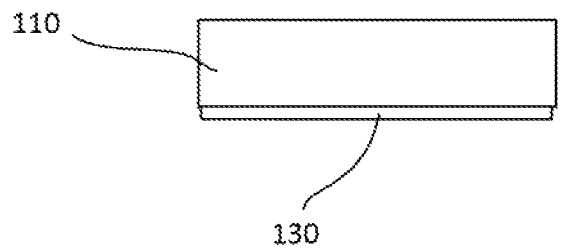
FIG. 8 schematically illustrates an attachment interface with a temperature sensitive coating.

To, withstand the relatively high temperatures caused by the brake, assembly when operated (i.e. during braking at landing) in some embodiments the composite material is formed from a temperature resistant resin 134. Additionally or alternatively, at least a portion of the composite fairing 110, such as the inner surface 110' adjacent to the brake assembly, has a ceramic coating 128 (FIG. 7), the ceramic coating being temperature resistant. It may also be desirable to coat at least a portion of the fairing with a temperature sensitive coating 130 (FIG. 8), such as temperature sensitive paint, that provides a visual indicator of either temperature reached at a particular location or an indication that a particular temperature threshold has been exceeded, thus facilitating maintenance inspections and actions.

FIGS. 5A and 5B schematically illustrate opposing isometric use of a further embodiment of the noise reduction fairing. In the embodiments shown in FIGS. 5A and 5B the fairing 110 also has a generally dished profile but in place of the attachment interface 112 of the embodiment illustrated in FIGS. 4A and 4B, a number of attachment points 120 are integrally formed in the fairing and are intended to interact with corresponding attachment features formed on the brake assembly. For example, as indicated in FIG. 5B, the integral attachment points 120 are formed in a location corresponding to available space between each of the brake piston housings, and consequently the corresponding attachment features may therefore be formed in the brake assembly between each brake piston housing.

In the embodiments shown in the Figures a cut out 122 is provided in the airing and that may be provided to accommodate the attachment of necessary hydraulic or control lines and cables to the brake assembly. It would be appreciated that any further number, or zero, of such openings 122 may be provided as necessary. It will also be appreciated that where such openings are provided in the fairing, the fairing may also include a corresponding cover arranged to fasten over the control line and fit In or over the opening 122. For example, a flexible gaiter or 'boot' may be provided. The cover therefore maintains the smooth outer surface of the fairing that the opening 122 otherwise interrupts.

Embodiments of the present invention therefore provides, a noise reduction fairing that provides localised noise reduction whilst minimising the acceleration of air flow passing over the fairing.

The invention claimed is:

1. An aircraft landing gear assembly comprising:
a plurality of noise-inducing elements, a first one of the noise-inducing elements comprising a first brake assembly;
a brake flange; and
a first noise reduction fairing having a first portion that extends in front of the first brake assembly to shield the first brake assembly from incident airflow and a second portion that is directly attached at a fixed position to the brake flange to thereby fix the first portion relative to the brake flange.

2. The aircraft landing gear assembly according to claim 1, wherein an inner surface of the first noise reduction fairing at least partially conforms to an adjacent portion of the first brake assembly.

3. The aircraft landing gear assembly according to claim 1, wherein the first noise reduction fairing is configured to be attached to the brake flange at a plurality of attachment points surrounding the brake flange.

4. The aircraft landing gear assembly according to claim 1, wherein the first noise reduction fairing comprises a composite material.

5. The aircraft landing gear assembly according to claim 4, wherein the first noise reduction fairing includes at least one metallic insert defining an attachment point.

6. The aircraft landing gear assembly according claim 4, wherein the composite material includes a temperature resistant resin.

7. The aircraft landing gear assembly according to claim 4, wherein the first noise reduction fairing includes a temperature resistant ceramic coating.

8. The aircraft landing gear assembly according to claim 1, wherein at least a portion of the first noise reduction fairing has a temperature sensitive coating.

9. The aircraft landing gear assembly of claim 1, wherein a second one of the noise-inducing elements comprises a second brake assembly.

10. The aircraft landing gear assembly of claim 9, further comprising a second brake flange and a second noise reduction fairing having a respective first portion that extends in front of the second brake assembly to shield the second brake assembly from incident airflow and a respective second portion that is directly attached at a fixed position to the second brake flange to thereby fix the respective first portion relative to the second brake flange.

11. The aircraft landing gear assembly of claim 1, wherein the fairing is shaped as a segment of a dished annulus.

12. The aircraft landing gear assembly of claim 1, wherein the fairing comprises a portion that surrounds only approximately 180 degrees of an outer circumference of the first brake assembly.

13. An aircraft including at least one landing gear assembly in accordance with claim 1.

14. An aircraft landing gear assembly comprising:
a plurality of noise-inducing elements, a first one of the noise-inducing elements comprising an electric drive system; and
a noise reduction fairing having a first portion that extends in front of the electric drive system to shield the electric drive system from incident airflow and a second portion that is directly attached at a fixed position relative to the electric drive system to thereby fix the first portion relative to the electric drive system.

15. The aircraft landing gear assembly according to claim 14, wherein an inner surface of the noise reduction fairing at least partially conforms to an adjacent portion of the electric drive assembly.

16. The aircraft landing gear assembly according to claim 14, wherein the noise reduction fairing is configured to be attached to the electric drive system.

17. The aircraft landing gear assembly according to claim 14, wherein the aircraft landing gear assembly comprises a shock strut to which the electric drive system is mounted, and the noise reduction fairing is attached at a plurality of attachment points to the to the shock strut.

\* \* \* \* \*